(12) United States Patent
Matsunaga et al.

(10) Patent No.: US 7,176,975 B2
(45) Date of Patent: Feb. 13, 2007

(54) IMAGE PICK-UP APPARATUS, IMAGE PICK-UP METHOD, AND STORAGE MEDIUM THAT RECORDS IMAGE PICK-UP METHOD PROGRAM

(75) Inventors: Tsuyoshi Matsunaga, Sayama (JP); Tetsuya Hayashi, Hanno (JP); Masaru Onozawa, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 656 days.

(21) Appl. No.: 10/171,954

(22) Filed: Jun. 14, 2002

(65) Prior Publication Data
US 2002/0191100 A1   Dec. 19, 2002

(30) Foreign Application Priority Data
Jun. 19, 2001   (JP) .............................. 2001-185543

(51) Int. Cl.
*G03B 13/00* (2006.01)
(52) U.S. Cl. ...................... 348/345; 348/349
(58) Field of Classification Search ................ 348/349, 348/345; 382/255
See application file for complete search history.

(56) References Cited

U.S. PATENT DOCUMENTS 5,420,635 A * 5/1995 Konishi et al. ............. 348/362

6,433,325 B1 * 8/2002 Trigg ....................... 250/201.3
2004/0201759 A1 * 10/2004 Horiuchi ..................... 348/254

FOREIGN PATENT DOCUMENTS

| JP | 6-350889 A | 12/1994 |
| JP | 2000-69277 A | 3/2000 |
| JP | 2000-251060 A | 9/2000 |

OTHER PUBLICATIONS

Jensen, John R., 1996. Introductory Digital Image Processing. Prentice-Hall, Inc. (http://filebox.vt.edu/users/jeadams/WebSite/SpatialImageEnhancement.htm).*

* cited by examiner

*Primary Examiner*—Ngoc-Yen Vu
*Assistant Examiner*—Anthony J. Daniels
(74) *Attorney, Agent, or Firm*—Frishauf, Holtz, Goodman & Chick, P.C.

(57) ABSTRACT

When a shutter key is pressed, the first image (in-focus image) is picked up and temporarily stored. The focus position is changed to a near- or far-focus position. The second image (out-of-focus image) is picked up and synthesized with the first image. The synthesized image is a soft-focus image in which a background around the contour of a main object is blurred.

1 Claim, 8 Drawing Sheets

IMAGE PICK-UP APPARATUS, IMAGE PICK-UP METHOD, AND STORAGE MEDIUM THAT RECORDS IMAGE PICK-UP METHOD PROGRAM

CROSS-REFERENCE TO RELATED APPLICATIONS

This application is based upon and claims the benefit of priority from the prior Japanese Patent Application No. 2001-185543, filed Jun. 19, 2001, the entire contents of which are incorporated herein by reference.

BACKGROUND OF THE INVENTION

1. Field of the Invention

The present invention relates to an image pick-up apparatus, a pick-up method, and a storage medium that records a pick-up method program, which are suitable for a digital still camera.

2. Description of the Related Art

Conventionally, soft-focus photography is used as one of photographic techniques. With the soft-focus photography, in, e.g., a portrait, a person is expressed sharply, and things around him are expressed softly. For silver halide cameras, filters and photographing lenses dedicated to soft-focus photography are prepared. Anyone who uses such a filter or lens can do soft-focus photography. If there is no dedicated filter or photographing lens, Vaseline or the like may be applied to the surface of a photographing lens (or a filter).

However, if soft-focus imaging is to be done using a digital still camera, the following problems are posed. Many digital still cameras cannot exchange the photographing lens and be mounted a filter except high-class models. To always carry a dedicated filter independently of whether it will be used is unsuitable for a digital still camera that is advantageous in its compact and lightweight body, portability, and ease of handling. In addition, the objective lens of a digital still camera generally has a small diameter. For this reason, it is difficult to obtain a satisfactory soft-focus imaging effect by applying Vaseline or the like to the surface of the objective lens.

BRIEF SUMMARY OF THE INVENTION

The present invention is directed to method and apparatus that substantially obviates one or more of the problems due to limitations and disadvantages of the related art. It is an object of the present invention to provide an image pick-up apparatus, image pick-up method, and a storage medium that stores a pick-up method program, which allow soft-focus imaging with a simple arrangement.

According to an embodiment of the present invention, an image pick-up apparatus comprises:

an image pick-up unit configured to pick up an object image;

an image pick-up instructing unit configured to instruct the image pick-up unit to pick up the image;

a focus adjusting unit configured to adjust focus of the object image picked up by the image pick-up unit;

a control unit configured to control the image pick-up unit and focus adjusting unit in accordance with one instruction by the image pick-up instructing unit to pick up the object image two times and controls to obtain an in-focus image and an out-of-focus image; and a synthesizing unit configured to generate a synthesized image by synthesizing the out-of-focus image with the in-focus image.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

An embodiment of an image pick-up apparatus according to the present invention will now be described with reference to the accompanying drawings.

First Embodiment

Figure 1:
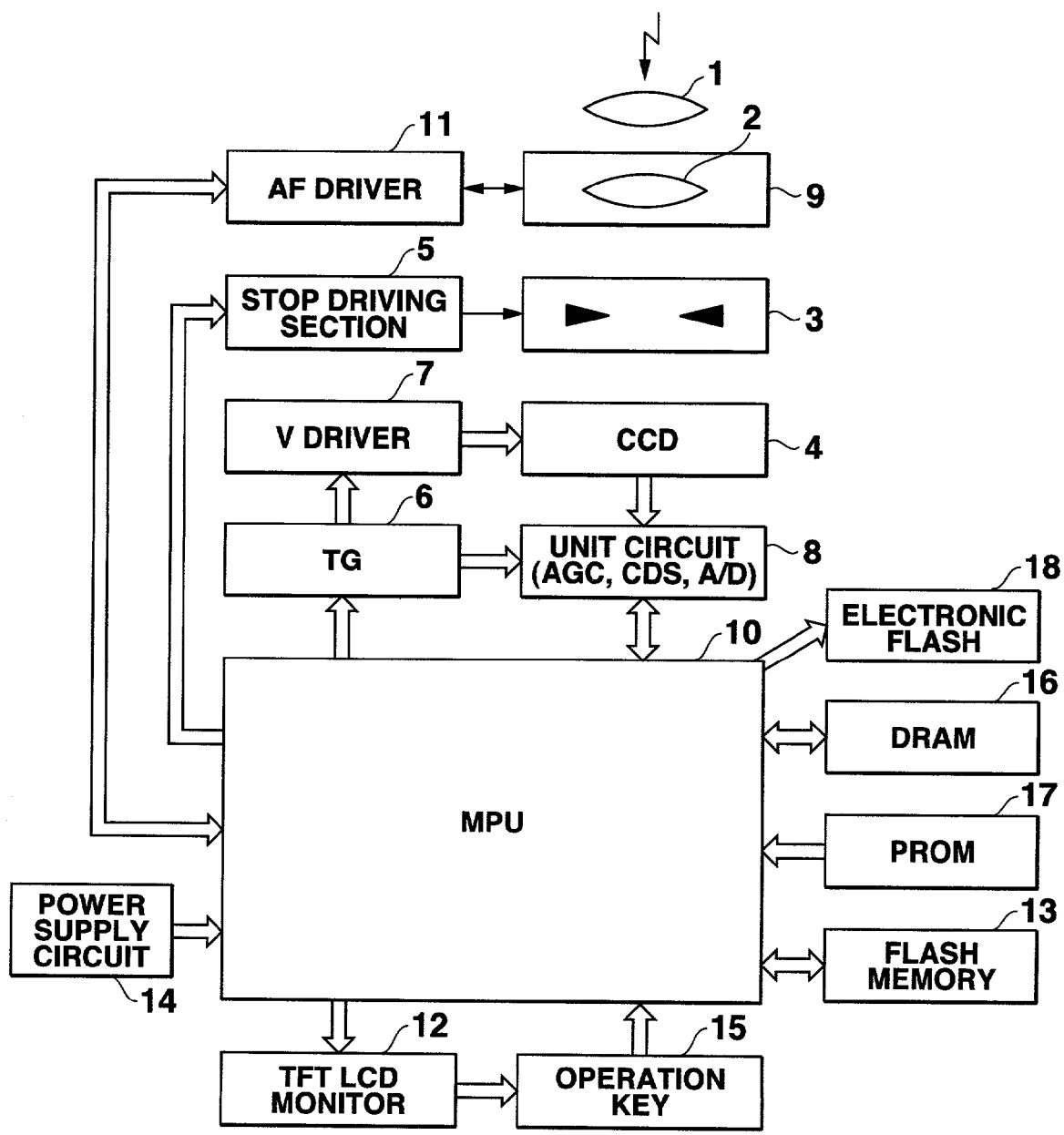
FIG. 1 is a block diagram of a digital still camera of all embodiments of the present invention.

FIG. 1 is a block diagram showing the electrical arrangement of a digital still camera according to the first embodiment of the present invention. This digital still camera has an AE (Auto Exposure) function and AF (Auto Focus) function of contrast scheme. The digital still camera also has a soft-focus mode as an operation mode at the time of imaging.

The digital still camera of this embodiment has a fixed lens 1, a focus lens 2, a CCD 4 serving as an image pick-up section for picking up an object image formed through a stop 3, a stop driving section 5 for changing the degree of opening of the stop 3, a TG (Timing Generator) 6 and vertical driver (V driver) 7 which drive the CCD 4, and a unit circuit 8 including a CDS (Correlated Double Sampling) circuit for holding an image pick-up signal output from the CCD 4, an AGC (Auto Gain Controller) for amplifying the image pick-up signal, and an A/D converter (AD) for converting the amplified image pick-up signal into a digital signal. The focus lens 2 is held by a driving mechanism 9 formed from an AF motor and the like. When the driving mechanism 9 is driven through an AF driver 11 under the control of an MPU (Micro Processing Unit) 10, the focus lens 2 moves in the direction of optical axis to adjust the focus of an object image formed on the CCD 4. That is, the focus lens 2, driving mechanism 9, and AF driver 11 form a focus adjusting section. In AE control, the CCD 4 is driven by the TG 6 and V driver 7 based on a shutter pulse sent from the MPU 10 to control the charge accumulation time. This implements an electronic shutter. In addition, the degree of opening of the stop 3 is controlled by a control signal sent from the MPU 10 to the stop driving section 5.

The MPU 10 has various kinds of signal processing and image processing functions. The MPU 10 generates a video signal from the digital image pick-up signal which is obtained by the unit circuit 8 and causes a TFT liquid crystal monitor 12 to display an object image sensed by the CCD 4 as a through image. At the time of imaging, the image pick-up signal is compressed to generate an image file having a predetermined format. The image file is stored in a flash memory 13 serving as a storage section. At the time of reproduction, the compressed image file is expanded and displayed on the TFT liquid crystal monitor 12.

A power supply circuit 14 including a power supply such as a battery, an operation key section 15 including various switches such as a shutter key, a DRAM 16, a PROM 17, and an internal electronic flash 18 are connected to the MPU 10. The DRAM 16 serves as a working memory for the MPU 10. At the time of imaging, the DRAM 16 also functions as an image memory for accumulating an image pick-up signal of one frame that is converted into a digital signal through the unit circuit 8. The PROM 17 is a program ROM in which an operation program necessary for controlling the respective sections and various data processing operations by the MPU 10. In this embodiment, especially, a program that causes the MPU 10 to function as a control section and synthesizing section is stored in the PROM 17. The PROM 17 may be a memory that can rewrite stored data such as a program as needed. The program or data may be partially stored in the flash memory 13.

Figure 2:
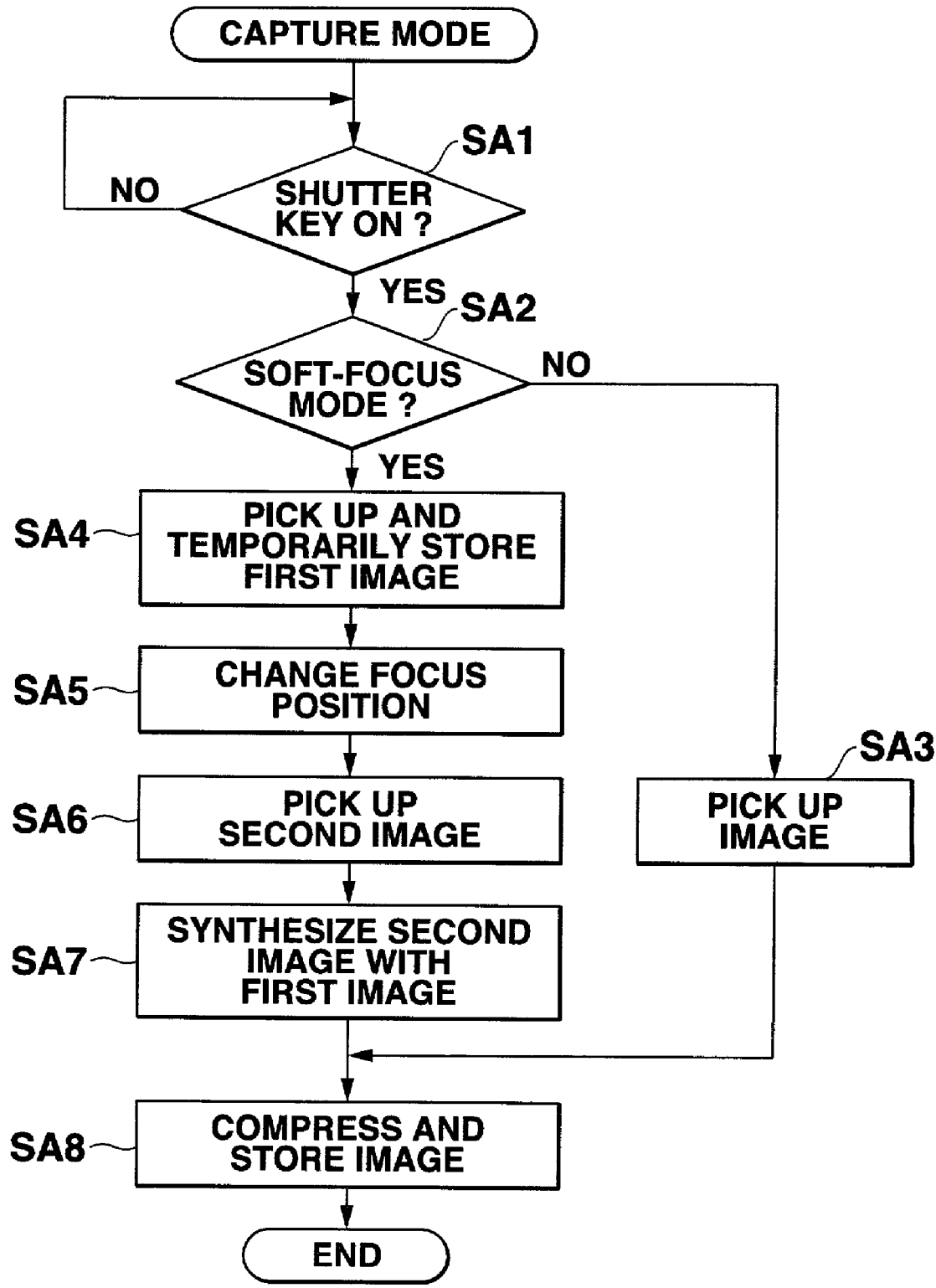
FIG. 2 is a flow chart showing operation in a capture mode according to the first embodiment of the present invention.

The operation of the digital still camera having the above arrangement in an imaging mode will be described with reference to the flow chart in FIG. 2. This flow chart represents operation in an image pick-up standby state in which a capture mode (image pick-up mode) for displaying a through image on the TFT liquid crystal monitor 12 is selected. In the following description, assume that the AF function of the digital still camera is ON.

When a shutter key (an image pick-up instruction section) is pressed (YES in step SA1), it is determined in step SA2 whether a soft-focus mode is set by the user. If the soft-focus mode is not set (NO in step SA2), an image (object image) is picked up by the CCD 4 (step SA3). The picked-up image is compressed and stored in the flash memory 13 (step SA8).

If the soft-focus mode is set (YES in step SA2), the first image (in-focus image) is picked up and temporarily stored in the DRAM 16 (step SA4). The focus lens 2 is driven to change the focus position to an out-of-focus position (step SA5). Then, the second image (out-of-focus image) is picked up (step SA6). The focus position changed in step SA5 is one of a near-focus position and a far-focus position. The moving amount of the focus lens 2 is a predetermined amount set in advance.

After that, the first and second images are averaged, thereby synthesizing the in-focus image that is picked up first and the out-of-focus image that is picked up next (step SA7). The synthesized image is compressed and stored in the flash memory 13 (step SA8). Thus, image pick-up operation of one cycle is ended.

In the image, i.e., synthesized image generated by synthesis processing in step SA7, an in-focus image that is focused on the object image is synthesized with an out-of-focus image that has focus not on the object image but on an object separated from the object image. In the synthesized image, the main object is slightly blurred. That is, a soft-focus image is obtained. Hence, the user can do soft-focus imaging only by normal image pick-up operation, i.e., pressing the shutter key once. In addition, unlike the prior art, no dedicated filter or dedicated imaging lens need be prepared, and no preparation of, e.g., applying Vaseline on the surface of the imaging lens (fixed lens 1) need be performed. For this reason, advantages required for a digital still camera, i.e., a compact and lightweight body, portability, and ease of handling can be maintained.

In the soft-focus mode of this embodiment, an in-focus image is picked up first, and then, an out-of-focus image is picked up. When the object is moving (for example, the object makes a slightly wry face), the object in a user's intended state is picked up as an in-focus image. With this operation, a soft-focus image of the object in the user's intended state can always be obtained.

Separately from the above-described processing, when an out-of-focus image is to be synthesized with an in-focus image, a shift (shift direction and shift amount when the object is moving) between the in-focus image and the out-of-focus image may be detected in advance using an image recognition technology, and the synthesis position of the out-of-focus image with respect to the in-focus image may be corrected in accordance with the detection result. In this case, a more natural soft-focus image can be obtained.

In this embodiment, an out-of-focus image is simply synthesized with an in-focus image in step SA7. In practicing the present invention, for example, in synthesizing two images, when weighting processing is executed to set the ratio of the in-focus image to be higher than that of the out-of-focus image, a more natural soft-focus image can be obtained.

In step SA5, the moving amount of the focus lens 2 is a predetermined amount set in advance. However, the moving amount may be, e.g., a moving amount corresponding to the degree of soft-focus effect set by the user in advance or, a moving amount determined in correspondence with a zoom magnification for an arrangement having a zoom function. In addition, when the user can set in advance the change amount of the focus position, the user can adjust the degree of soft-focus in accordance with his taste, resulting in improved convenience.

As described above, according to the first embodiment, the image pick-up apparatus comprises an image pick-up section which picks up an object image, an image pick-up instructing section which instructs the image pick-up section to pick up the image, a focus adjusting section which adjusts focus of the object image picked up by the image pick-up section, a control section which controls the image pick-up section and focus adjusting section in accordance with one instruction by the image pick-up instructing section to pick up the object image two times and controls to obtain an image in an in-focus state and an image in an out-of-focus state, and a synthesizing section which generates a synthesized image by synthesizing the in-focus image and the out-of-focus image, which are picked up under control of the control section.

In this arrangement, when one image pick up instruction is issued from the image pick-up instructing section, the in-focus image focused on the object image and the out-of-focus image that is not focused on the object image are automatically continuously picked up by the image pick-up section. A synthesized image of the in-focus image and out-of-focus image is generated by the synthesizing section. In the generated synthesized image, a background around the contour of the object is blurred. That is, a soft-focus image is obtained. Hence, a soft-focus image can be picked up only by the same operation as the normal image pick-up operation.

The control section controls the operation of the focus adjusting section to pick up an image in an in-focus state first and then an image in an out-of-focus state.

At the time of image pick-up, an in-focus image is picked up first, and then, an out-of-focus image is picked up. Hence, even when the object is moving, a clear object image in an intended state can always be obtained.

Other embodiments of the digital still camera according to the present invention will be described. The same portions as those of the first embodiment will be indicated in the same reference numerals and their detailed description will be omitted. The electrical arrangement of the digital still camera according to the other embodiments is the same as that shown in FIG. 1.

Second Embodiment

The second embodiment is different from the first embodiment in a program stored in the PROM 17. In this embodiment, a program that causes the MPU 10 to function as the control section, image pick-up condition setting section, and exposure control section is stored in the PROM 17.

Figure 3:
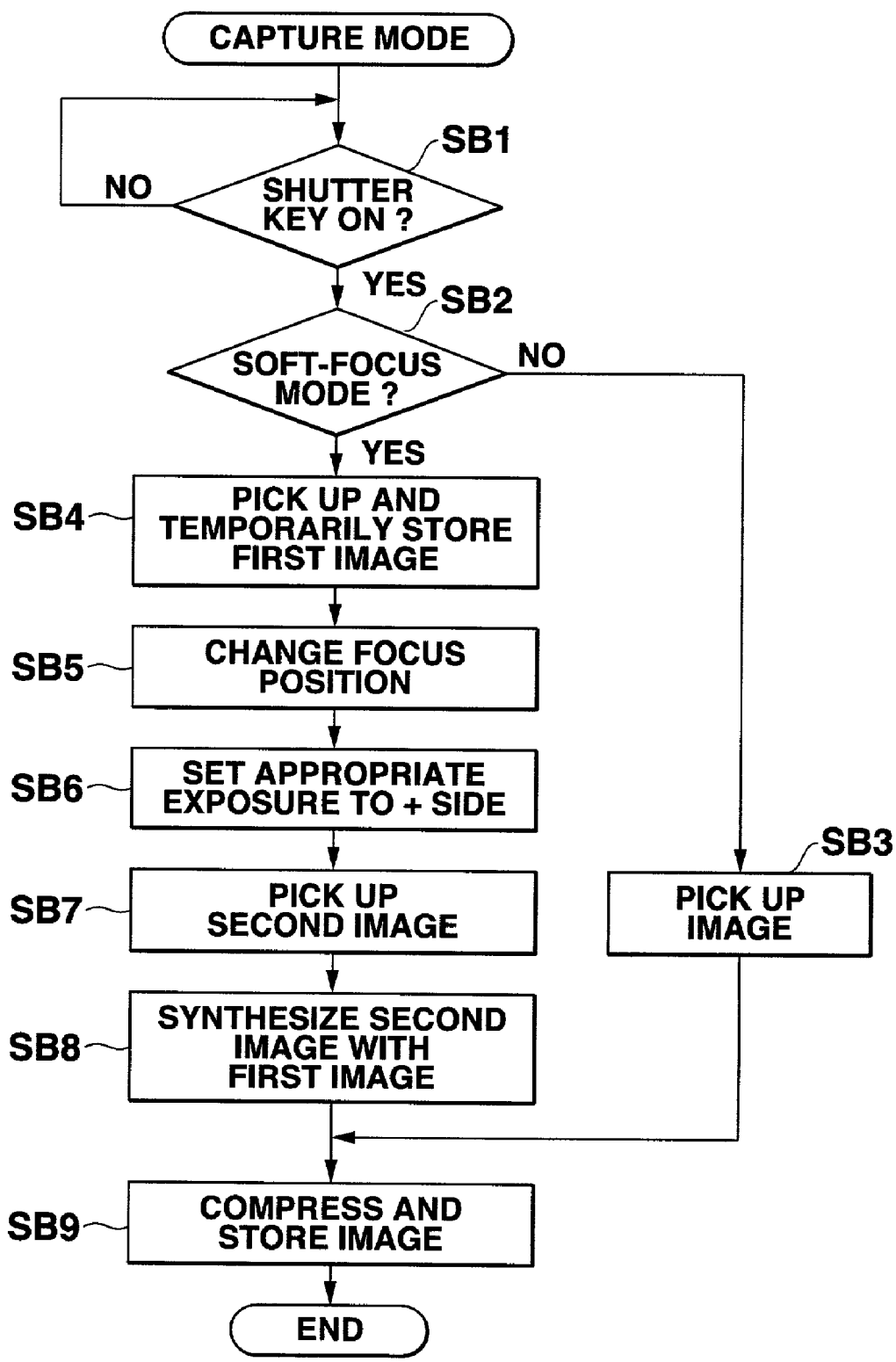
FIG. 3 is a flow chart showing operation in a capture mode according to the second embodiment of the present invention.

Operation in an image pick-up standby state when a capture mode is selected in the digital still camera according to this embodiment will be described in accordance with the flow chart shown in FIG. 3. In the following description, assume that the AE function of the digital still camera is ON.

When the shutter key is pressed (YES in step SB1), it is determined in step SB2 whether a soft-focus mode is set by the user. If the soft-focus mode is not set (NO in step SB2), an image (object image) is picked up by the CCD 4 (step SB3). The picked-up image is compressed and stored in the flash memory 13 (step SB9).

If the soft-focus mode is set (YES in step SB2), the first image (in-focus image) is picked up and temporarily stored in the DRAM 16 (step SB4). The focus lens 2 is driven to change the focus position (step SB5). The focus position changed in step SB5 is one of a near-focus position and a far-focus position. The moving amount of the focus lens 2 is a predetermined amount set in advance. The above operation is the same as in the first embodiment.

In this embodiment, after the focus position is changed (step SB5), the set value of an appropriate exposure amount which should be controlled at the time of image pick-up is changed to "+" (overexposure) side (step SB6). Then, the second image (out-of-focus image) is picked up (step SB7).

After that, the first and second images are averaged, thereby synthesizing the first image and the second image (step SB8). The synthesized image is compressed and stored in the flash memory 13 (step SB9). Thus, image pick-up operation of one cycle is ended.

As described above, in this embodiment, since the set value of the appropriate exposure amount is changed to the overexposure side when picking up the second image (out-of-focus image), the out-of-focus image is brighter than the in-focus image. Hence, the blur state in the soft-focus image can be expressed softly. When the user can set in advance the change amount of the appropriate exposure amount, the user can adjust the blur state in accordance with his taste, resulting in improved convenience. The remaining effects are the same as in the first embodiment.

Third Embodiment

The third embodiment is different from the first embodiment in a program stored in the PROM 17. In this embodiment, the MPU 10 has an AWB (Auto White Balance) function of controlling the gain in the auto gain controller (AGC) in the unit circuit 8 for each of RGB colors. In addition, a program which causes the MPU 10 to function as an image pick-up condition setting section and also function as a white balance control section together with the unit circuit 8 is stored in the PROM 17.

Figure 4:
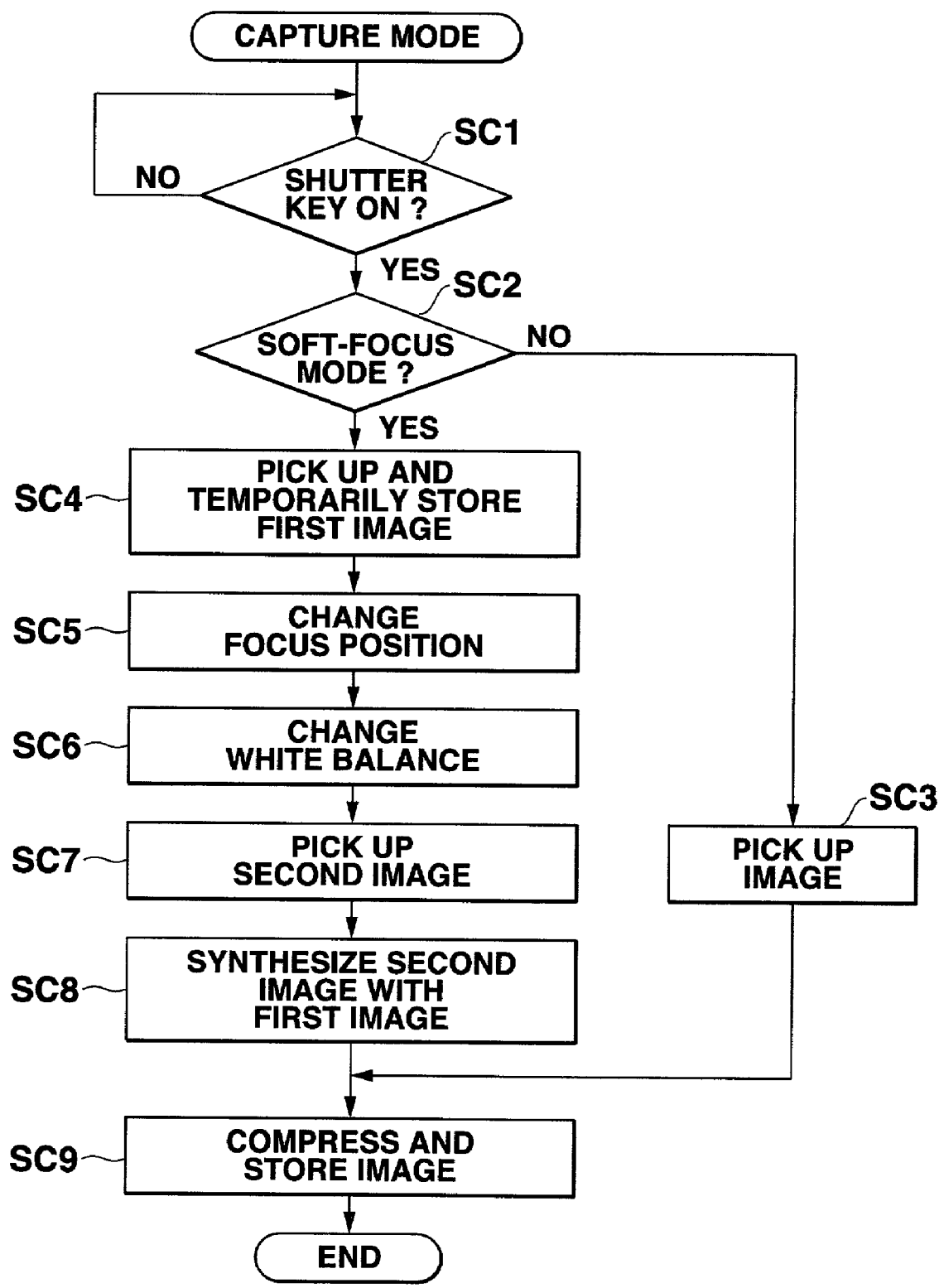
FIG. 4 is a flow chart showing operation in a capture mode according to the third embodiment of the present invention.

Operation in an image pick-up standby state when a capture mode is selected in the digital still camera according to this embodiment will be described in accordance with the flow chart shown in FIG. 4. In the following description, assume that the AE function of the digital still camera is ON.

When the shutter key is pressed (YES in step SC1), it is determined in step SC2 whether a soft-focus mode is set by the user. If the soft-focus mode is not set (NO in step SC2), an image (object image) is picked up by the CCD 4 (step SC3). The picked-up image is compressed and stored in the flash memory 13 (step SC9).

If the soft-focus mode is set (YES in step SC2), the first image (in-focus image) is picked up and temporarily stored in the DRAM 16 (step SC4). The focus lens 2 is driven to change the focus position (step SC5). The focus position changed in step SC5 is one of a near-focus position and a far-focus position. The moving amount of the focus lens 2 is a predetermined amount set in advance. The above operation is the same as in the first embodiment.

In this embodiment, after the focus position is changed, white balance set at the time of picking up the first image, i.e., the set value of gain for each of RGB colors in the auto gain controller (AGC) of the unit circuit 8 is changed (step SC6). Then, the second image (out-of-focus image) is picked up (step SC7). After that, the first and second images are averaged, thereby synthesizing the first image and the second image (step SC8). The synthesized image is compressed and stored in the flash memory 13 (step SC9). Thus, image pick-up operation of one cycle is ended.

As described above, in this embodiment, color balance in an out-of-focus image can be intentionally shifted by changing the set content of white balance in picking up the second image (out-of-focus image). Hence, a more fantastic soft-focus image can be obtained. If the user can set or select the set content of white balance in advance, for example, the user can strengthen (or weaken) an arbitrary one of RGB colors or designate its degree, a fantastic soft-focus image according to the user's taste can be picked up, resulting in improved convenience. The remaining effects are the same as in the first embodiment.

In this embodiment, at the time of picking up the second image (out-of-focus image), the set content of white balance is changed from that in picking up the first image, unlike the second embodiment. Alternatively, the set content of another image pick-up condition at the time of picking up the second image and, more specifically, at the time of generating image data of one frame based on an image pick-up signal output from the CCD 4 may be changed from that in picking up the first image. In this case, an effect corresponding to the image pick-up condition whose set content is changed can be obtained in a soft-focus image. For example, an F-number at the time of picking up the second image is changed to the full-aperture side. Since the depth of field in the second image is shallow, the degree of blur at a portion other than the object at the center can be increased. In this case as well, when the user can set the degree of change of the set content of the image pick-up condition in advance, the convenience can be improved. In addition to the change in appropriate exposure amount in the second embodiment, the set content of white balance may be changed as a matter of course.

Fourth Embodiment

The fourth embodiment is different from the first embodiment in a program stored in the PROM 17. In this embodiment, a program, which causes the MPU 10 to function as an image processing section and image processing content setting section, is stored in the PROM 17.

Figure 5:
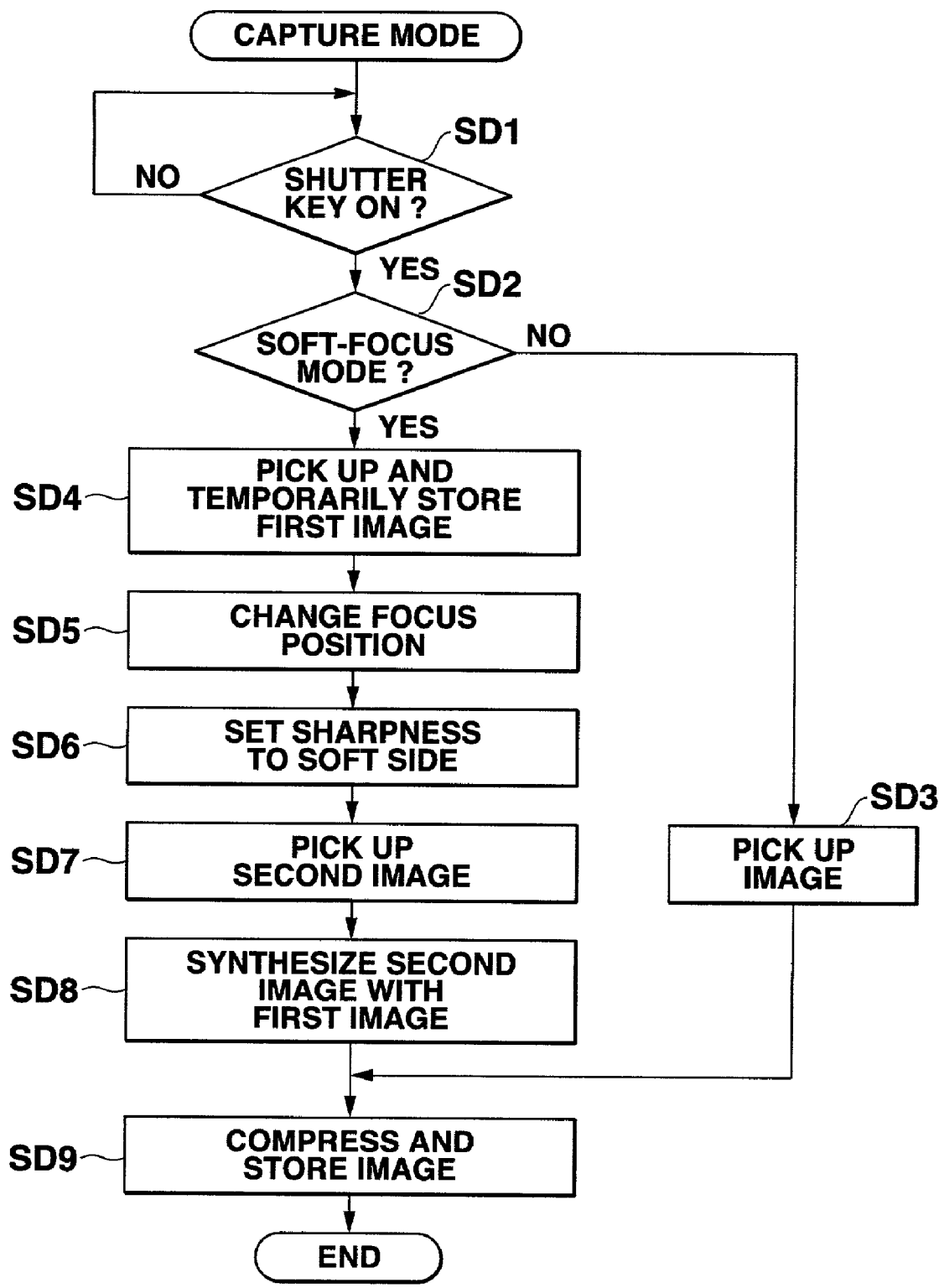
FIG. 5 is a flow chart showing operation in a capture mode according to the fourth embodiment of the present invention.

Operation in an image pick-up standby state when a capture mode is selected in the digital still camera according to this embodiment will be described in accordance with the flow chart shown in FIG. 5. In the following description, assume that the AE function of the digital still camera is ON.

When the shutter key is pressed (YES in step SD1), it is determined in step SD2 whether a soft-focus mode is set by the user. If the soft-focus mode is not set (NO in step SD2), an image (object image) is picked up by the CCD 4 (step SD3). The picked-up image is compressed and stored in the flash memory 13 (step SD9).

If the soft-focus mode is set (YES in step SD2), the first image (in-focus image) is picked up and temporarily stored in the DRAM 16 (step SD4). A focus lens 2 is driven to change the focus position (step SD5). The focus position changed in step SD5 is one of a near-focus position and a far-focus position. The moving amount of the focus lens 2 is a predetermined amount set in advance. The above operation is the same as in the first embodiment.

In this embodiment, after the focus position is changed (step SD5), the set content of sharpness (contour enhancement) as one of image quality adjusting functions prepared in advance is changed to the soft side from the enhancement level set at the time of picking up the first image (step SD6). Then, the second image (out-of-focus image) is picked up (step SD7). After that, the first and second images are averaged, thereby synthesizing the first image and the second image (step SD8). The synthesized image is compressed and stored in the flash memory 13 (step SD9). Thus, image pick-up operation of one cycle is ended.

In this embodiment, since the set content of sharpness is changed in picking up the second image (out-of-focus image), the object in a blur state in the out-of-focus image can be expressed more softly. Hence, the blur state in the soft-focus image can be expressed more softly. Even in this embodiment, if the user can set in advance the degree of change in set content of sharpness, the convenience can be improved. The remaining effects are the same as in the first embodiment.

In this embodiment, at the time of picking up the second image (out-of-focus image), the set content of sharpness is changed from that in picking up the first image. Alternatively, the set content of another image processing to be executed, before synthesis with the first image, for the second image and, more specifically, image data of one frame temporarily stored in the DRAM 16 may be changed from that for the first image. In this case as well, a variety of soft effects can be added to the soft-focus image after synthesis. For example, in step SD6 described above, saturation of the second image may be set to be lower than that of the first image. Alternatively, the contrast of the second image may be set to lower (weaker) than that of the first image. In this case as well, when the user can set the degree of change of the set content in advance, the convenience can be improved.

Fifth Embodiment

The fifth embodiment is different from the first embodiment in a program stored in the PROM 17. In this embodiment, a program, which causes the MPU 10 to function as a light emission control section, is stored in the PROM 17.

Figure 6:
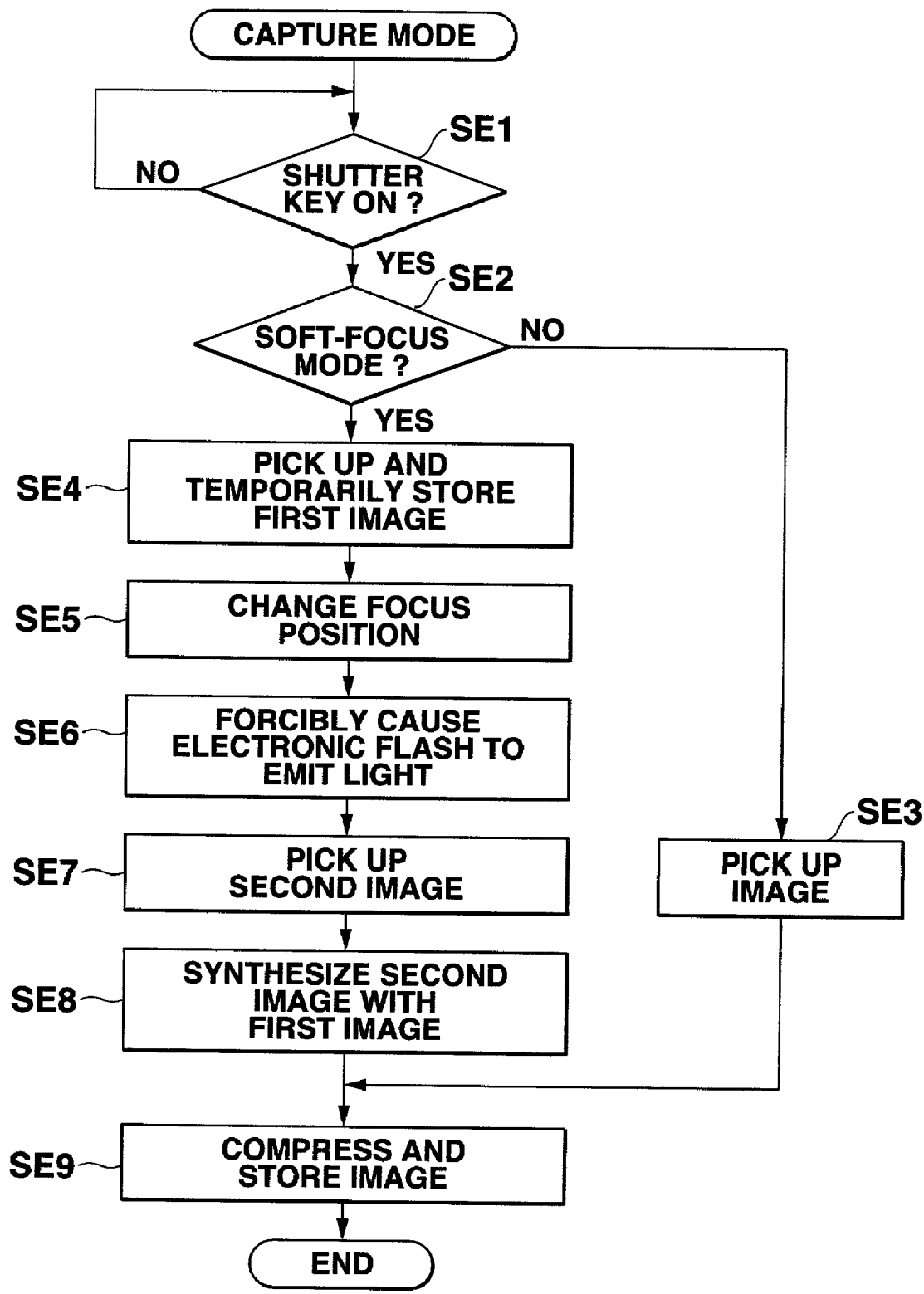
FIG. 6 is a flow chart showing operation in a capture mode according to the fifth embodiment of the present invention.

Operation in an image pick-up standby state when a capture mode is selected in the digital still camera according to this embodiment will be described in accordance with the flow chart shown in FIG. 6. In the following description, assume that the AE function of the digital still camera is ON.

When the shutter key is pressed (YES in step SE1), it is determined in step SE2 whether a soft-focus mode is set by the user. If the soft-focus mode is not set (NO in step SE2), an image (object image) is picked up by the CCD 4 (step SE3). The picked-up image is compressed and stored in the flash memory 13 (step SE9).

If the soft-focus mode is set (YES in step SE2), the first image (in-focus image) is picked up and temporarily stored in the DRAM 16 (step SE4). The focus lens 2 is driven to change the focus position (step SE5). The focus position changed in step SE5 is one of a near-focus position and a far-focus position. The moving amount of the focus lens 2 is a predetermined amount set in advance. The above operation is the same as in the first embodiment.

In this embodiment, after the focus position is changed (step SE5), the internal electronic flash 18 is forcibly caused to emit light (step SE6) to pick up the second image (out-of-focus image) in an overexposure state (step SE7). After that, the first and second images are averaged, thereby synthesizing the first image and the second image (step SE8). The synthesized image is compressed and stored in the flash memory 13 (step SE9). Thus, image pick-up operation of one cycle is ended.

In this embodiment, since the second image (out-of-focus image) can always be picked up in an overexposure state, the blur state in the soft-focus image can be expressed more softly. Unlike the second embodiment in which the second image is picked up in an overexposure state, things around a main object, e.g., a person in imaging a portrait can be expressed more softly. The remaining effects are the same as in the first embodiment.

Sixth Embodiment

The sixth embodiment is different from the first embodiment in a program stored in the PROM 17.

Figure 7:
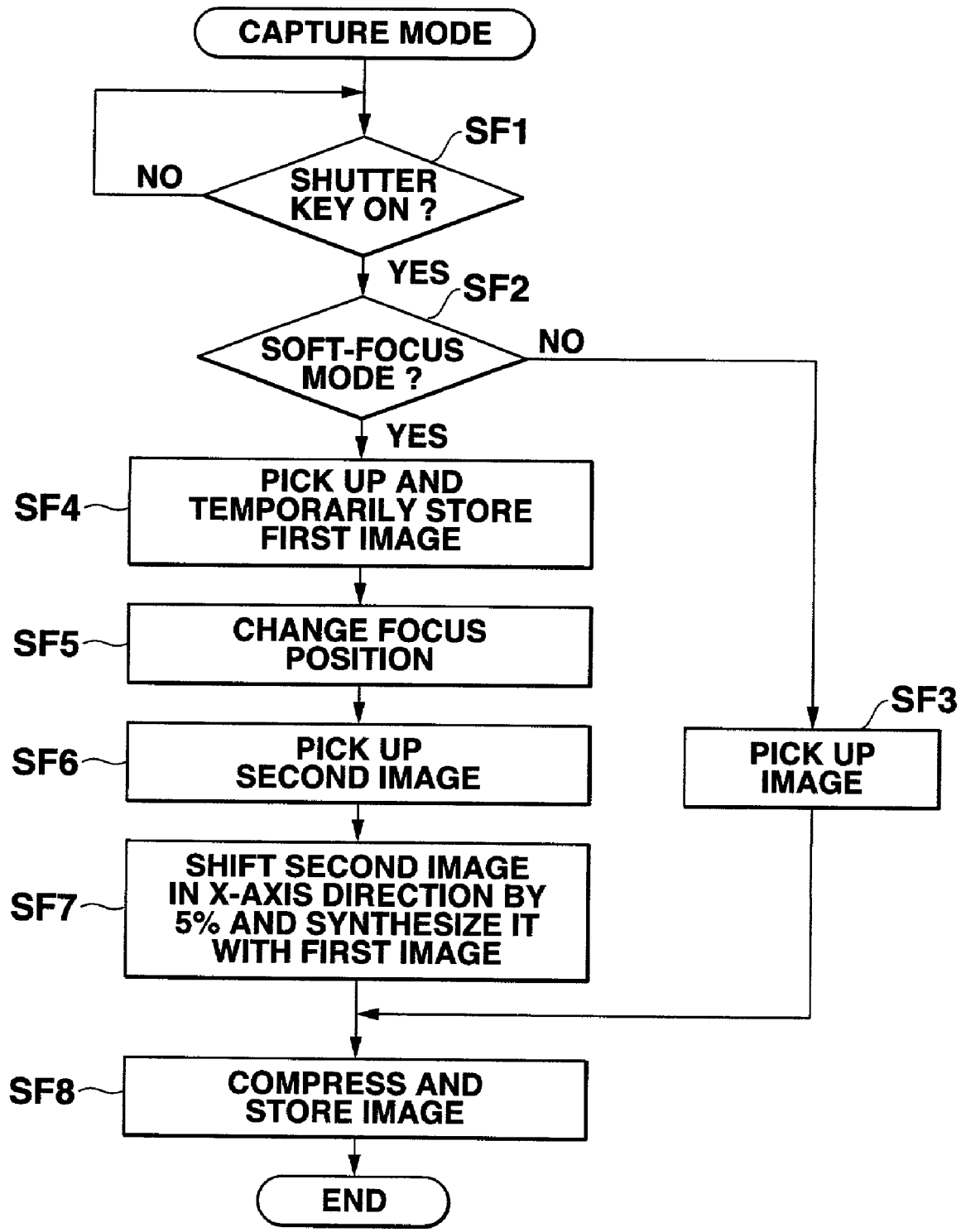
FIG. 7 is a flow chart showing operation in a capture mode according to the sixth embodiment of the present invention.

Operation in an image pick-up standby state when a capture mode is selected in the digital still camera according to this embodiment will be described in accordance with the flow chart shown in FIG. 7. In the following description, assume that the AE function of the digital still camera is ON.

When the shutter key is pressed (YES in step SF1), it is determined in step SF2 whether a soft-focus mode is set by the user. If the soft-focus mode is not set (NO in step SF2), an image (object image) is picked up by the CCD 4 (step SF3). The picked-up image is compressed and stored in the flash memory 13 (step SF8).

If the soft-focus mode is set (YES in step SF2), the first image (in-focus image) is picked up and temporarily stored in the DRAM 16 (step SF4). The focus lens 2 is driven to change the focus position (step SF5). After that, the second image (out-of-focus image) is picked up (step SF6). The (changed) focus position changed in step SF5 is one of a near-focus position and a far-focus position. The moving amount of the focus lens 2 is a predetermined amount set in advance.

After that, the second image is intentionally shifted in the X-axis direction (horizontal direction) by 5%. Then, the first and second images are averaged, thereby synthesizing the first image and the second image (step SF7). The synthesized image is compressed and stored in the flash memory 13 (step SF8). Thus, image pick-up operation of one cycle is ended.

In this embodiment, in addition to a mere soft effect, a camera shake effect can be given to the image synthesized in step SF7, i.e., the soft-focus image. In this embodiment, the second image is shifted in the X-axis direction (horizontal direction) by 5% and then synthesized with the first image. When the user can set in advance the direction and amount of shift of the second image, a camera shake effect according to the user's taste can be given to the soft-focus image, resulting in improved convenience.

When the digital still camera has a zoom function and uses a zoom lens, the focal length of the zoom lens may be set to be longer (telephoto side) by a predetermine distance in picking up the second image (out-of-focus image) than in picking up the first image (in-focus image). Then, the second image larger than the first image may be picked up and synthesized with the first image. When an image processing technique (digital zoom) is used, the picked up second image (out-of-focus image) may be enlarged by a predetermined zoom magnification and then synthesized with the first image. In this case, such an effect can be given to the soft-focus image that camera shake has occurred, e.g., in all directions (360°) from the image center.

Seventh Embodiment

The seventh embodiment is different from the first embodiment in a program stored in the PROM 17.

Figure 8:
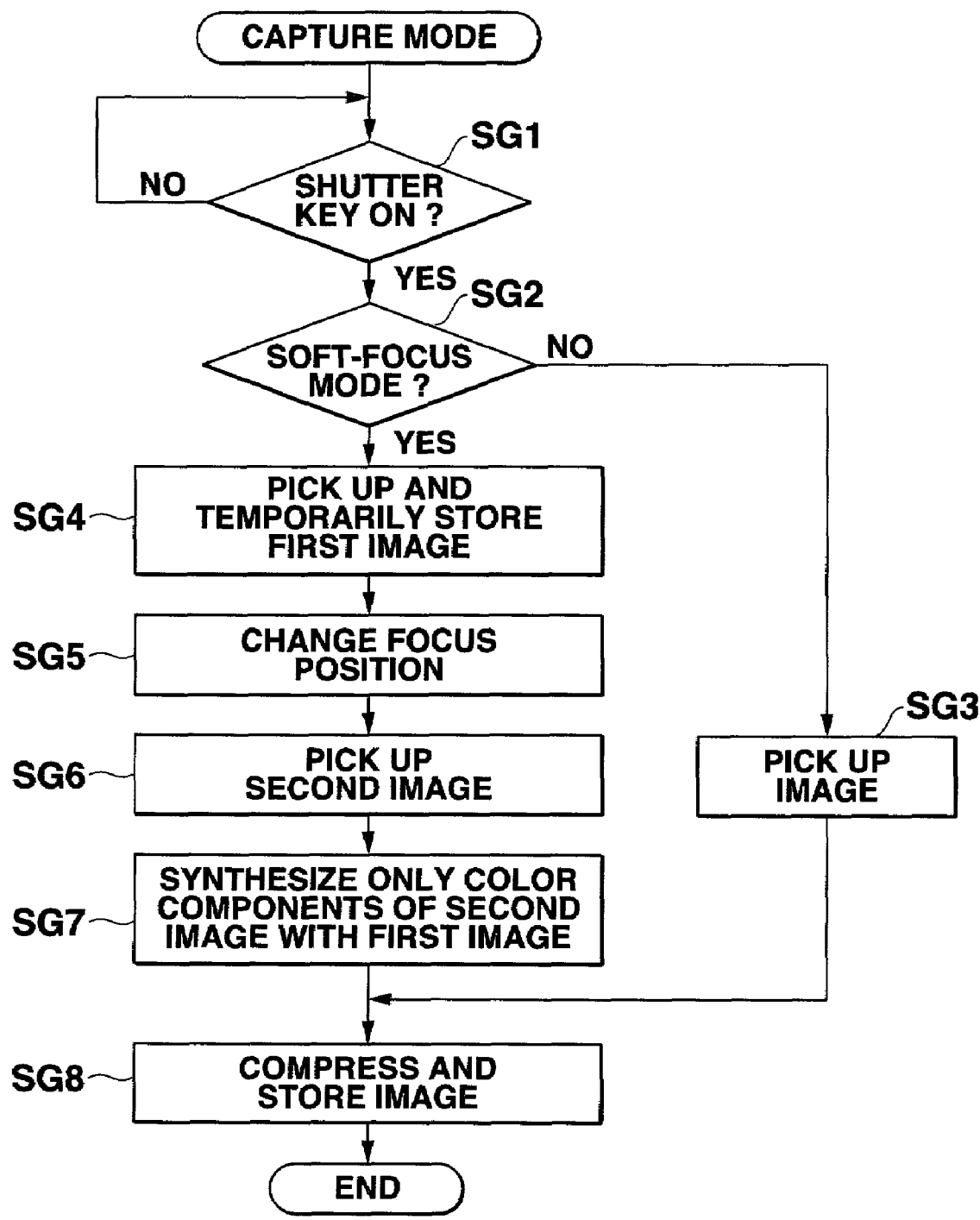
FIG. 8 is a flow chart showing operation in a capture mode according to the seventh embodiment of the present invention.

Operation in an image pick-up standby state when a capture mode is selected in the digital still camera according to this embodiment will be described in accordance with the flow chart shown in FIG. 8. In the following description, assume that the AE function of the digital still camera is ON.

When the shutter key is pressed (YES in step SG1), it is determined in step SG2 whether a soft-focus mode is set by the user. If the soft-focus mode is not set (NO in step SG2), an image (object image) is picked up by the CCD 4 (step SG3). The picked-up image is compressed and stored in the flash memory 13 (step SG8).

If the soft-focus mode is set (YES in step SG2), the first image (in-focus image) is picked up and temporarily stored in the DRAM 16 (step SG4). The focus lens 2 is driven to change the focus position (step SG5). After that, the second image (out-of-focus image) is picked up (step SG6). The focus position changed in step SG5 is one of a near-focus position and a far-focus position. The moving amount of the focus lens 2 is a predetermined amount set in advance.

After that, the first image and only color components (Cb and Cr data) of the second image are averaged, thereby synthesizing the first image and the second image (step SG7). The synthesized image is compressed and stored in the flash memory 13 (step SG8). Thus, image pick-up operation of one cycle is ended.

In this embodiment, since only color components of the second image are synthesized with the first image, a soft-focus image with light feeling of blur colors can be obtained. Unlike this embodiment, for example, only the luminance component of the second image may be synthesized with the first image. In this case, a soft-focus image with a blur contour can be obtained.

In this embodiment as well, when the user can set in advance the degree of synthesis of the first image and a specific component such as a color component or luminance component of the second image, an effect according to the user's taste can be obtained, resulting in improved convenience. The remaining effects are the same as in the first embodiment.

As has been described above, according to the present invention, in response to one image pick-up instruction input, a focus adjusting section is driven to set an object in an in-focus state, and an image pick-up section is caused to pick up the object. Next, the focus adjusting section is driven to set the object in an out-of-focus state, and the image pick-up section is caused to pick up the object. Then, a synthesizing section is caused to synthesize the picked-up images.

Hence, when image pick-up operation is performed, a synthesis image of an in-focus image and out-of-focus image of a single object are obtained. A soft-focus image can be picked up only by the same operation as the normal image pick-up operation.

In the above description, the present invention is employed in a digital still camera having only a camera function, like a conventional silver halide camera. Alternatively, the present invention can also be employed in an information device having a recording medium, which stores a predetermined program necessary for the device to function as an image pick-up apparatus, e.g., a personal computer or various kinds of portable information terminals. Even in this case, the same effects as in the above-described digital still camera can be obtained.

What is claimed is:

1. An image pick-up apparatus comprising:
   an image pick-up unit configured to pick up an object image;
   an image pick-up instructing unit configured to instruct the image pick-up unit to pick up the image;
   an exposure control unit configured to control an exposure amount of the image picked up by the image pick-up unit;
   a focus adjusting unit configured to adjust focus of the image picked up by the image pick-up unit by shifting a focusing lens;
   a control unit configured to control the image pick-up unit, the exposure control unit, and the focus adjusting unit in accordance with one instruction by the image pick-up instructing unit to pick up the object image two times to obtain an in-focus image with an exposure amount for correctly exposing the image and an out-of-focus image with an overexposure, wherein at least one of the in-focus image and the out-of-focus image is obtained by shifting the focusing lens; and
   a synthesizing unit configured to generate a synthesized image by synthesizing the out-of-focus image with the in-focus image.

* * * * *